United States Patent [19]

Burney

[11] Patent Number: 4,818,924
[45] Date of Patent: Apr. 4, 1989

[54] ELECTRIC ACTUATOR FOR AUTOMOTIVE AIR CONDITIONING SYSTEMS

[75] Inventor: Charles F. Burney, Orland, Calif.

[73] Assignee: A.R.A. Manufacturing Co., Grand Prairie, Tex.

[21] Appl. No.: 80,393

[22] Filed: Jul. 31, 1987

[51] Int. Cl.⁴ .............................................. G05B 13/02
[52] U.S. Cl. .................................. 318/561; 318/672; 318/434
[58] Field of Search ............... 318/291, 293, 294, 295, 318/434, 560, 561, 563, 663, 666, 671, 672, 674

[56] References Cited

U.S. PATENT DOCUMENTS

| | | | |
|---|---|---|---|
| 4,078,198 | 3/1978 | Murakoshi et al. | 318/663 X |
| 4,388,571 | 6/1983 | Tada et al. | 318/293 |
| 4,394,605 | 7/1983 | Terazawa | 318/291 X |
| 4,481,452 | 11/1984 | Kitano et al. | 318/293 X |
| 4,514,666 | 4/1985 | Suzuki | 318/293 |
| 4,549,125 | 10/1985 | Sonobe | 318/663 |
| 4,591,773 | 5/1986 | Numata | 318/663 |
| 4,712,053 | 12/1987 | Numata | 318/663 |

Primary Examiner—Bentsu Ro

[57] ABSTRACT

An electric actuator apparatus particularly suitable for use as part of an automotive air conditioning system. The apparatus uses a direct current motor to drive a final output element in accordance with an input voltage signal. The apparatus is inherently protected against stalled conditions and no limit switches are required. The apparatus is self-adapting to different physical environments which define the range of travel of the final output element. The apparatus may be operated as a two-position actuator or, with the addition of a feedback signal corresponding to the postion of the final output element, may be operated as an infinite position or multi-position actuator.

14 Claims, 3 Drawing Sheets

ELECTRIC ACTUATOR FOR AUTOMOTIVE AIR CONDITIONING SYSTEMS

BACKGROUND OF THE INVENTION

The present invention relates to an improved electric actuator. The apparatus may find application as part of any control system utilizing mechanical motion or position as an output but is particularly suited for use in automotive air conditioning systems.

Conventional automotive air conditioning systems normally utilize an actuator of the vacuum type. These actuators are switch operated devices which use the vacuum generated by the automobile's engine to effect mechanical motion of final control elements. Vacuum-type actuators are not expensive, provide a reasonable amount of power, and are inherently protected from burnout. Advances in automotive air conditioning technology, however, have created a need for an actuator with features a vacuum-type actuator is not able to provide. Modern, sophisticated automotive air conditioning systems now demand actuators capable of multi-position or infinite position actuation. Vacuum-type actuators, however, are on-off devices and are only capable of two position operation. Additionally, vacuum-type actuators require hoses to be run from the vacuum source to the actuator. As modern automotive air conditioning systems can require the use of five or more actuators, the employment of multiple vacuum-type actuators can be quite cumbersome.

Accordingly, electric actuators have been used in modern automotive air conditioning systems to overcome the problems enumerated above. Conventional electric actuators, however, also have a number of disadvantages in this application. Two-position electric actuators must employ limit switches which shut off power to the unit when the final mechanical output element reaches the end of its range of travel. Limit switches are necessary since a stalled electric motor will draw enough current to present a real danger of fire. Utilizing limit switches in the design, however, means that the range of travel of each actuator must be matched to its physical environment. In an air conditioning system requiring multiple actuators, each with a different range of motion requirement owing to different physical environments, this means that each actuator must be individually designed with limit switches appropriately located and calibrated. This adds time and expense to the design and manufacturing process. Another problem arises when using conventional electric actuators to provide multi-position actuation since a special segmented switch design must be employed to define each intended position. Conventional electric actuators in a multi-position application also require an additional control wire for each additional position which the actuator provides. This adds complexity to the design and manufacturing process requires that additional inventory be maintained, and increases the total cost of the system.

The apparatus which is the present invention is an improved electric actuator which overcomes the disadvantages of conventional electric actuators in automotive air conditioning applications. The apparatus can function as a two position, multiposition, or infinite position actuator while employing only three wires to control its movement. No limit switches are required as the unit is inherently protected against stalls. Furthermore, the apparatus defines its own range of movement according to the physical environment in which it is placed. Therefore, a single actuator design may be used throughout the system in an application requiring multiple actuators.

SUMMARY OF THE PRESENT INVENTION

The present invention comprises a D.C. motor coupled via a suitable gear train to a final mechanical element. The D.C. motor is caused to rotate in one direction or the other by electronic circuitry according to the voltage level of an input signal. The electronic circuitry is also capable of sensing when the final mechanical element driven by the D.C. motor reaches its limit of travel. This is accomplished by sensing the current drawn by the D.C. motor which is higher when the motor is stalled. The circuitry operates to shut off power to the motor when a stalled condition is sensed. In this way, the necessity of limit switches is avoided. The circuitry will not allow the motor to operate again until an input signal is received which will cause the motor to move the final mechanical element in a direction away from its previously reached limit of travel.

The apparatus may be operated as above as a two-position actuator. Alternatively, a potentiometer which produces a voltage proportional to the position of the final mechanical element may be added to the biasing network of the circuitry. Without any further modifications, the circuitry will act as a closed loop feedback control system which positions the final mechanical element in accordance with the level of the input voltage. The input voltage may then be varied continuously or in a step-wise fashion to produce either an infinite position or multi-position actuator, respectively.

DETAILED DESCRIPTION OF THE PREFERRED EMBODIMENT

Figure 1:
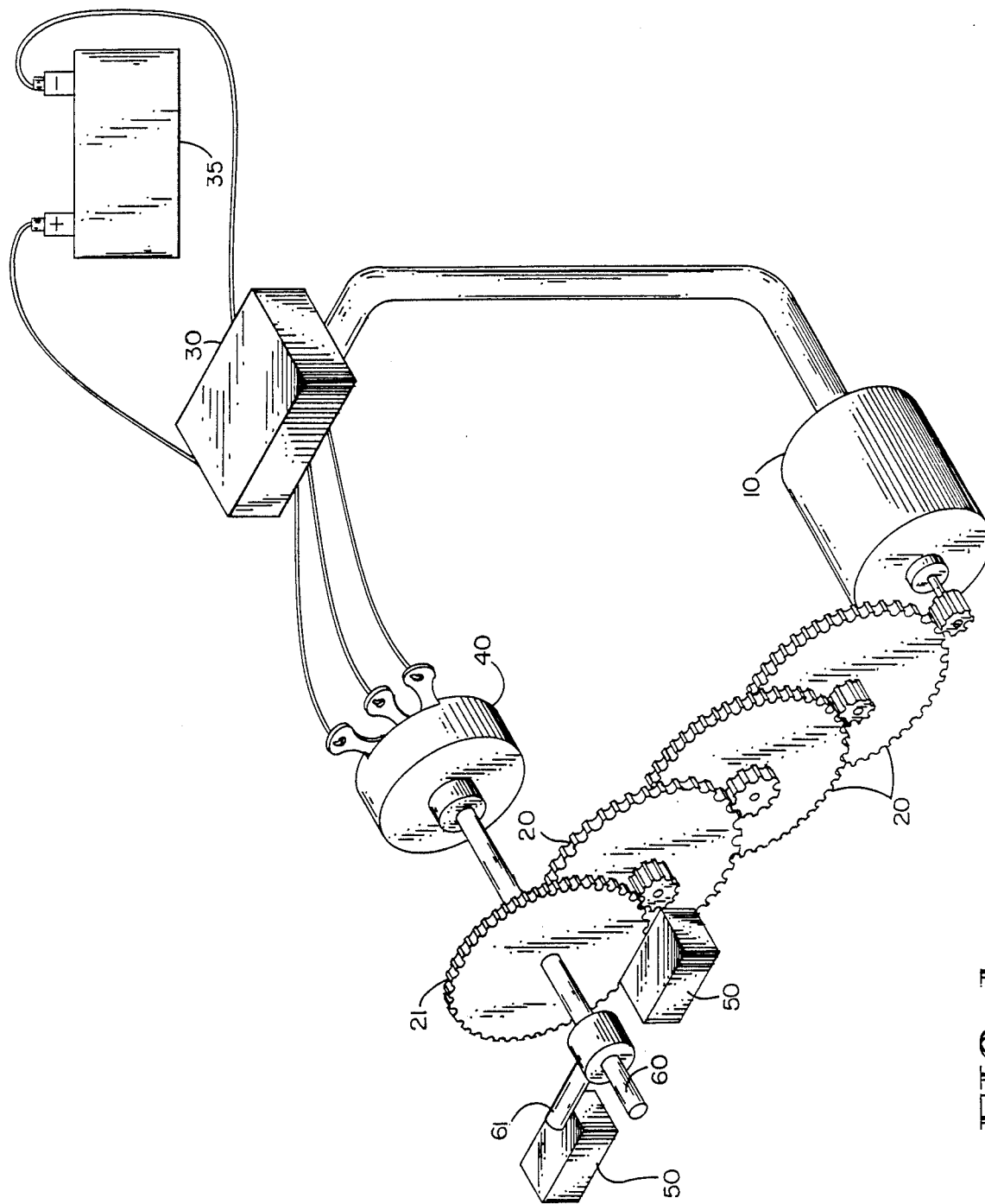
FIG. 1 is a depiction of the entire system showing the basic components of the actuator.

FIG. 1 shows the basic components which make up the actuator that is the present invention. A D.C. motor 10 is coupled to gear train 20. The final output gear 21 is connected to shaft 60. Connected perpendicularly to shaft 60 is final mechanical element 61 which engages mechanical stops 50 as shaft 60 rotates. Final mechanical element 61 is the final output element of the actuator and is shown as simply a shaft or member but could be any type of mechanical element or device which can be driven by shaft 60. Similarly, mechanical stops 50 could be any structure or structures which limit the motion of the final output element. For reasons of simplicity, however, they are depicted as being simply mechanical stops.

Control circuitry 30 receives power from battery 35 and controls the flow of current to D.C. motor 10. Control circuitry 30 receives a voltage input signal by a means not shown which is used to determine in which direction final mechanical element 50 is to be driven. Shown also is potentiometer 40 which also furnishes an input signal or signals to control circuitry 30. In the simplest embodiment of the present invention, potentiometer 40 is not present at all. As will be explained below, however, potentiometer 40 furnishes a voltage signal to control circuitry 30 which is proportional to the position of final mechanical element 50.

As aforesaid, control circuitry receives an input voltage which determines whether D.C. motor 10 is to be driven and in which direction. This input voltage may be generated by some manual control means or, as will be discussed briefly below in regard to another alternative embodiment, a sensing means such as a temperature sensor. Thus, the input voltage either represents a manual command to change the position of the final output element or represents, in the case of the alternative embodiment where the apparatus is operated as a closed-loop feedback control system, the setpoint signal.

Figure 2:
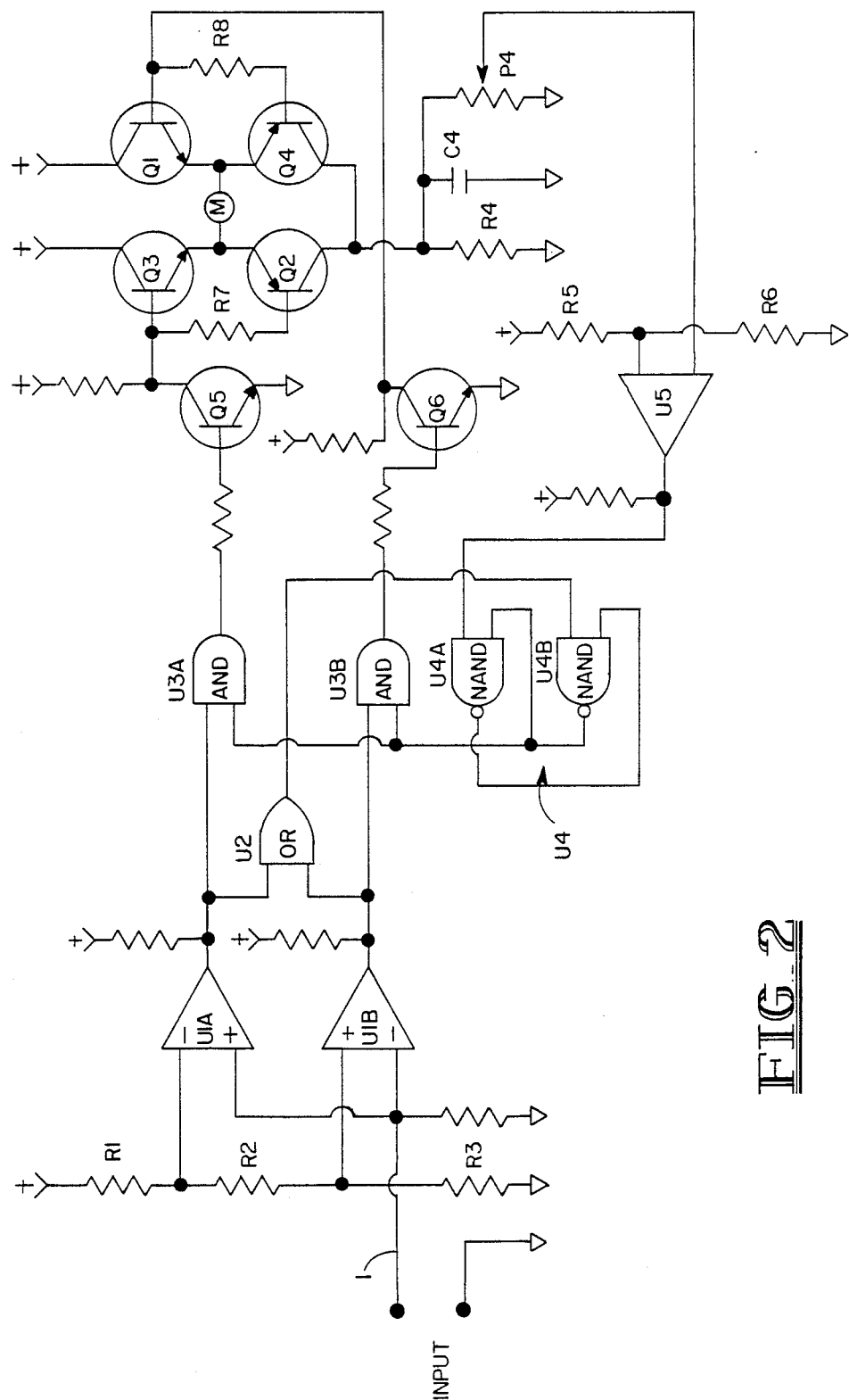
FIG. 2 is an electrical schematic showing the electronic components and their connections which constitute the control circuitry.

Referring now to FIG. 2, there is shown an electrical schematic of control circuit 30. Port 1 receives the input voltage signal which is then transmitted to the noninverting terminal of comparator U1A and the inverting terminal of comparator U1B. The other inputs to comparator U1A and U1B are reference inputs produced by a voltage divider made up of resistors R1, R2, and R3. Comparator U1A receives at its inverting input the supply voltage dropped across resistor R2. Comparator U1B receives at its noninverting input the supply voltage dropped across resistors R1 and R2. Each of comparators U1A and U1B is biased such that its output is low unless its noninverting input exceeds its inverting input, in which case, the output is pulled up to the supply voltage. Thus, comparator U1A goes high only when the input voltage exceeds the supply voltage dropped across resistor R1 while comparator U1B goes high only the input voltage is less than the supply voltage dropped across resistors R1 and R2. Thus, the comparator pair creates a non-active region for the input signal at which both comparator outputs are low. There is also no input voltage level which will cause both comparator outputs to be high simultaneously.

The outputs of comparator U1A and U1B are then input to AND gate U3A and U3B respectively. Both AND gates also receive an input from the output of NAND gate U4B. The outputs of AND gates U3A and U3B are connected to the bases of transistors Q5 and Q6, respectively. Thus, assuming that the output of NAND gate U4B is high, a high output from comparator U1A will turn on transistor Q5 while a high output from comparator U1B will turn on transistor Q6. Both transistors Q5 and Q6 are turned off otherwise.

Transistors Q3 and Q4 are connected in push-pull fashion across the power terminals of D.C. motor 10. Transistors Q1 and Q2 are similarly connected in the other direction across the power terminals of D.C. motor 10. Together, these two pairs of transistors form an H-bridge circuit which causes D.C. motor 10 to rotate in one direction or the other depending on whether transistor Q5 or transistor Q6 is turned on. If both transistors Q5 and Q6 are turned off, corresponding to a non-active input voltage, the collectors of both transistors are pulled up to the supply voltage. This prevents current from flowing out of the bases of transistors Q2 and Q4 which maintains all four transistors in a non-conductive state. If transistor Q5 is turned on, the bse of transistor Q2 is grounded. A current path is thus provided from the emitter of transistor Q1 through D.C. motor 10 to the emitter of transistor Q2. In an analogous manner, if transistor Q6 is turned on, transistors Q3 and Q4 are turned on causing current to flow through D.C. motor 10 in the other direction. In this way, the input voltage causes rotation of D.C. motor 10 in one direction when higher than the supply voltage dropped across resistor R1 and causes rotation of the motor in the other direction when lower than the supply voltage dropped across resistors R1 and R2. When the input voltage is in the non-active region, on the other hand, D.C. motor 10 remains shut off.

NAND gates U4A and U4B form a bistable latch U4 which is the output stage of a circuit which shuts off D.C. motor when the motor is stalled. One of the inputs to latch U4 is the output of comparator U5. The noninverting input of comparator U5 comes from the voltage divider made up of resistors R5 and R6 across which is applied the supply voltage. The inverting input comes from potentiometer P4. The input voltage from P4 is a voltage proportional to the current through resistor R4 and potentiometer P4 itself. The current flowing through resistor R4 and potentiometer P4 is the current flowing through D.C. motor 10 assuming no current flows through capacitor C4. Thus, the input voltage to comparator U5's inverting input is proportional to the motor current. Capacitor C4 shunts current to ground until charged to the collector voltage of transistors Q2 and Q4. Thus, capacitor C4, resistor R4, and potentiometer P4 form an RC low-pass filter for the input voltage to comparator U5's inverting input. This prevents the circuit from sensing high frequency current spikes which are transient and not due to a stalled condition. Such a transient occurs during initial startup of D.C. motor 10.

Comparator U5 is biased such that its output state is high when its noninverting input exceeds its inverting output and is grounded otherwise. Thus, assuming the motor current is below a specified value such the inverting input of comparator U5 is lower than its noninverting input, the output of comparator U5 will be high. When the motor current exceeds a specified value, on the other hand, the output of comparator U5 will go low.

Latch U4 receives inputs from OR gate U2 and comparator U5. The normal state of latch U4 is such that the output of NAND gate U4B, which is connected to AND gates U3A and U3B, is high. Thus, AND gates U3A and U3B are enabled to pass through high outputs from comparators U1A and U1B, respectively. In the normal output state of latch U4, toggling of the output from OR gate U2 which inputs to NAND gate U4B has no effect on the output state of the latch. When the output of comparator U5 goes low, however, the output state of latch U4 changes. The output of NAND gate U4B then goes low which prevents transistors Q5 and Q6 from conducting. In this way, current to motor 10 is shut off when an overcurrent condition, due to final mechanical element 61 reaching its limit of travel, is detected.

When current to motor 10 is shut off, the output of comparator U5 returns to a high state. Latch U4 remains in a state disabling operation of motor 10, however, until the output of OR gate U2 goes low. This will necessarily happen if an input voltage is applied to port 1 which causes motor 10 to rotate in the opposite direction and move the final output element away from its previously reached limit of travel. The output state of latch U4 then returns to normal, and control circuit 30 operates as before.

Figure 3:
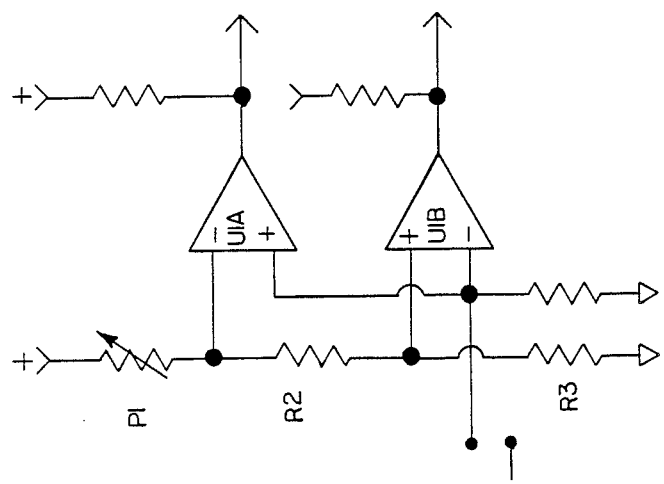
FIG. 3 is an electrical schematic showing how the biasing network may be modified by adding a potentiometer producing a voltage proportional to the position of the final mechanical element.

FIG. 3 shows the input stage of control circuit 30 in an alternative embodiment. In this embodiment, resistor R1 is replaced by potentiometer P1 which is mechanically coupled to, for example, shaft 60. Thus, the reference voltage applied to comparators U1A and U1B varies in correspondence with the position of the final output element. Potentiometer P1 is connected such that as the final output element moves in accordance with a particular input voltage, the reference voltage changes so as to move the inactive voltage region toward the existing input voltage. Motor 10 is then shut off when the inactive region includes the existing voltage. Thus, in this alternative embodiment, control circuit 30 becomes a closed-loop feedback control system which regulates the position of the final output element in an on-off fashion. The input voltage applied to port 1 can then be regarded as a setpoint signal controlling the position of the final output element.

Figure 4:
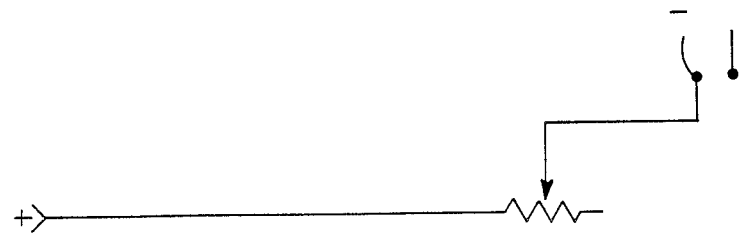
FIG. 4 is an electrical schematic showing how the input circuitry may be configured to produce a multi-position actuator.
Figure 5:
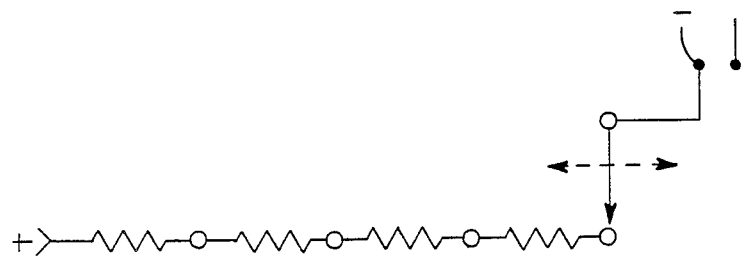
FIG. 5 is an electrical schematic showing how the input circuitry may be configured to produce an infinite position actuator.

FIG. 4 shows an example of how a setpoint signal for the alternative embodiment may be generated. In this example, the input voltage applied to port 1 comes from a manually adjustable potentiometer. This allows the actuator to function as an infinite position actuator as the final output element may be positioned to any one of an infinite number of positions. Similarly, FIG. 5 shows the input voltage coming from a multi-throw switch, which connects to the input port any of several discrete points along a voltage divider. In this configuration, the alternative embodiment acts as a multi-position actuator causing the final output element to be positioned to any of a number of discrete positions.

Figure 6:
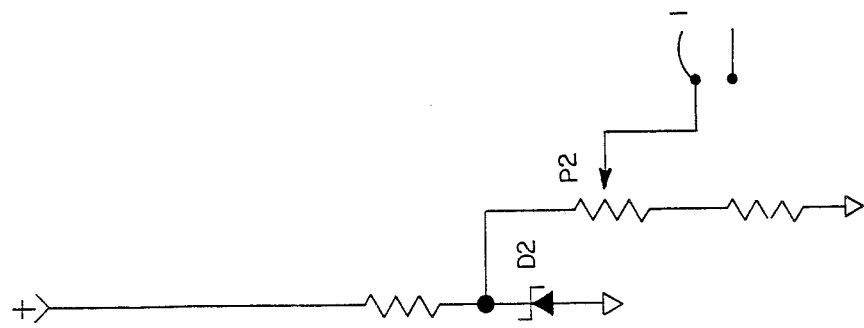
FIG. 6 is an electrical schematic showing how the circuitry of FIG. 5 may be modified to control a variable other than position, this example being temperature.

Finally, FIG. 6 shows another configuration in which a measured physical variable further modifies the input signal. If movement of the final output element effects a change in a physical variable, such as temperature, a voltage signal proportional to that physical variable may be negatively fed back to the input of control circuit 30 and thereby cause the apparatus to regulate that physical variable. In the example shown in FIG. 6, a temperature sensitive Zener diode D2 generates a voltage drop across it proportional to the ambient temperature. As the temperature rises, the input voltage to the apparatus increases which may, for example, cause an airflow controlling device to increase the flow of cool air to the interior of the automobile. By feeding the voltage from diode D2 to a manually adjustable potentiometer P2 before inputting to the apparatus, a means is provided for varying the setpoint temperature which the apparatus will operate to maintain.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims.

What is claimed:

1. An electric actuator apparatus for controlling the movement of a mechanical output element in accordance with an electrical input signal comprising:

an electrical motor having a rotating driveshaft operable by the application of direct current wherein the polarity of said direct current determines the direction of rotation of said driveshaft;

a mechanical output element mechanically coupled to said driveshaft so as to undergo motion in accordance with the rotation of said driveshaft;

means for causing direct current to be applied to said motor in one direction when said input signal exceeds a first voltage value and causing direct current to be applied to said motor in an opposite direction when said input signal is less than a second voltage value;

means for blocking the application of direct current to said motor when said input signal is at a level between said first and second voltage values;

means for detecting when said motor is drawing an excessive amount of current;

means for disabling application of direct current to said motor when an excessive amount of current is detected; and, means for continuing said disabling of current to said motor until said input signal returns to a value between said first and second voltage values and said excessive current condition no longer exists.

2. The apparatus of claim 1 further comprising means for preventing the disabling of current to said motor when said excessive amount of current is of short duration.

3. The apparatus of claim 1 wherein said means for causing application of current to said motor when said input signal is above said first voltage value or below said second voltage value and means for blocking current to said motor otherwise, comprises:

a first and second comparator means having a first and second reference input, respectively, wherein said first and second reference inputs receive said first and second voltage values, respectively; and motor current control means for enabling application of current to said motor in accordance with the output states of said first and second comparator means.

4. The apparatus of claim 3 wherein said means for detecting said excessive amount of current comprises a potentiometer giving a voltage output proportional to the current drawn by said motor and inputting said voltage output to a third comparator means having an appropriate reference input.

5. The apparatus of claim 4 wherein said means for disabling application of current to said motor comprises a gating means receiving inputs from said first, second and third comparator means.

6. The apparatus of claim 5 further comprising means for preventing the disabling of current to said motor when said excessive amount of current is of short duration.

7. The apparatus of claim 6 wherein said means for preventing the disabling of current to said motor when said excessive amount of current is of short duration comprises a shunt capacitor connected in parallel with said potentiometer.

8. The apparatus of claim 7 wherein said means for continuing said disabling of current to said motor until said excessive current condition no longer exists and said input signal returns to a value between said first and second voltage values comprises a latch means receiving inputs from said first, second, and third comparator means and outputting a latch signal to said gating means.

9. An electric actuator apparatus for controlling the movement of a mechanical output element in accordance with an electrical input signal comprising:
  an electrical motor having a rotating driveshaft operable by the application of direct current wherein the polarity of said direct current determines the direction of rotation of said driveshaft;
  a mechanical output element mechanically coupled to said driveshaft so as to undergo motion in accordance with the rotation of said driveshaft;
  means for causing direct current to be applied to said motor in one direction when said input signal exceeds a first voltage value and causing direct current to be applied to said motor in an opposite direction when said input signal is less than a second voltage value;
  means for blocking the application of direct current to said motor when said input signal is at a level between said first and second voltage values; and
  means for modifying said first and second voltage values in proportion to the position of said mechanical output element such that said apparatus acts to regulate said mechanical output element's position.

10. The apparatus of claim 9 wherein said means for modifying said first and second voltage values comprises a potentiometer mechanically coupled to said mechanical output element.

11. The apparatus of claim 9 further comprising means for modifying said input signal to produce a proportional change in said mechanical output element's position.

12. The apparatus of claim 11 wherein said means for modifying said input signal comprises an adjustable potentiometer to continuously vary the position of said mechanical output element.

13. The apparatus of claim 12 wherein said adjustable potentiometer is connected in parallel with a temperature sensitive diode and wherein said mechanical output element operates to effect a change in the temperature sensed by said diode in a direction enabling said apparatus to regulate temperature.

14. The apparatus of claim 11 wherein said means for modifying said input signal comprises a multi-throw switch which produces one of a number of input voltage levels to vary the position of said mechanical output element in step-wise fashion.

* * * * *